May 21, 1957　　　L. T. SCHULER　　　2,793,045
DETACHABLE AIRCRAFT SIMULATING BODY FOR TRICYCLES
Filed July 1, 1954　　　　　　　　　　　　2 Sheets-Sheet 1
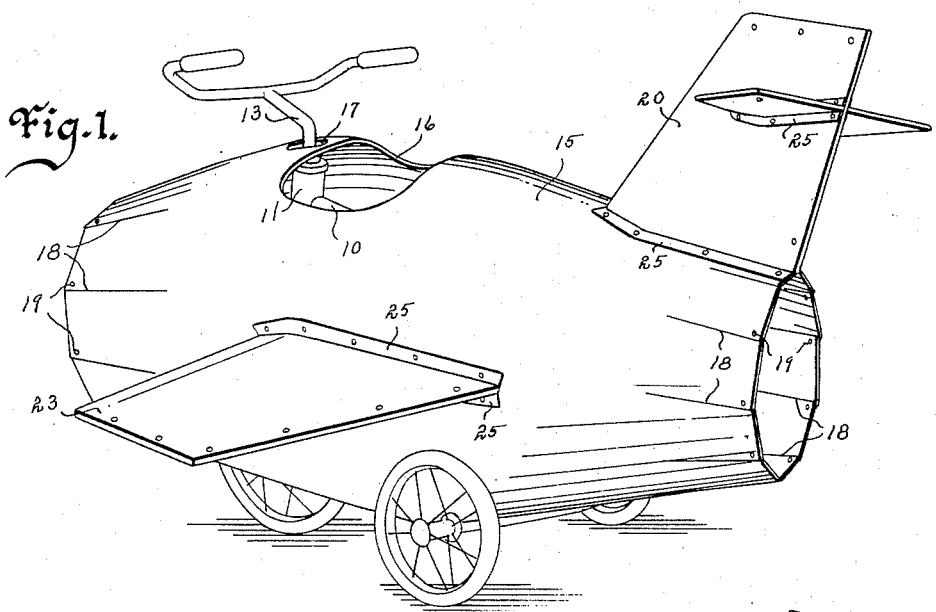
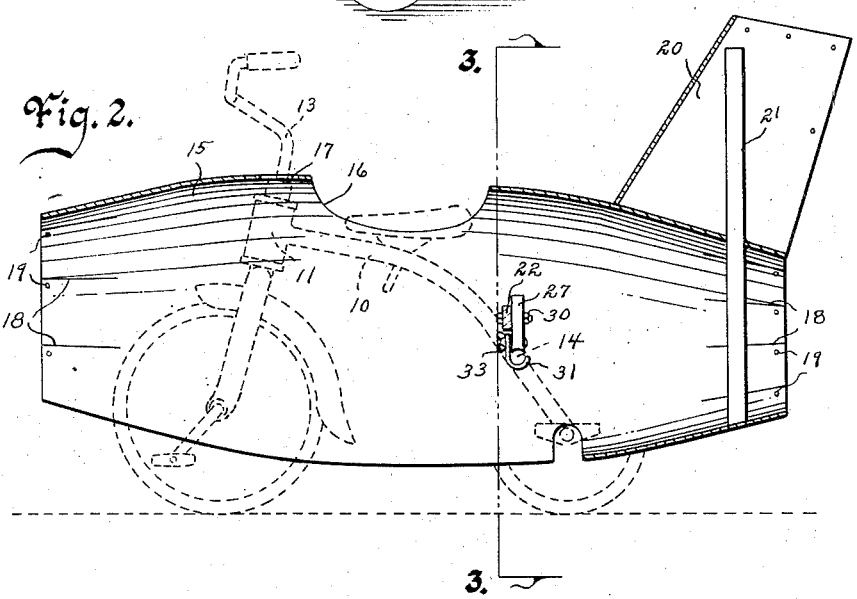
Inventor
Leo T. Schuler
by Talbert Dick & Adler
Attorneys
Witness
Edward P. Seeley May 21, 1957 L. T. SCHULER 2,793,045
DETACHABLE AIRCRAFT SIMULATING BODY FOR TRICYCLES
Filed July 1, 1954 2 Sheets-Sheet 2

Inventor
Leo T. Schuler
by Talbert Dick & Adler
Attorneys

Witness
Edward P. Seeley

United States Patent Office 2,793,045
Patented May 21, 1957

2,793,045
DETACHABLE AIRCRAFT SIMULATING BODY FOR TRICYCLES

Leo T. Schuler, Des Moines, Iowa

Application July 1, 1954, Serial No. 440,731

2 Claims. (Cl. 280—1.21)

This invention relates to detachable seating compartments for tricycles or like and more particularly to a housing compartment having symbolic characteristics such as that of an aircraft.

One of the most universally owned and used items by children is a tricycle. On the other hand, the most thrilling activity that most youngsters can conceive is that of flying an airplane.

Therefore the principal object of my invention is to provide a body member having the general outline of an airplane that may be installed on a tricycle or like.

A further object of this invention is to provide a tricycle airplane body portion that is light of weight and capable of quick attachment to or removal from the tricycle.

A still further object of my invention is to provide a knocked down airplane body for tricycles and like that may be quickly assembled and installed.

A still further object of this invention is to provide an airplane fuselage, wings and tail sections for tricycles, the major portions of which are cardboard or like.

Still further objects of my invention are to provide an airplane outlined housing for tricycles that are economical in manufacture, durable in use, and refined in appearance.

These and other objects will be apparent to those skilled in the art.

My invention consists in the construction, arrangement, and combination of the various parts of the device, whereby the objects contemplated are attained as hereinafter more fully set forth, pointed out in my claims, and illustrated in the accompanying drawings, in which:

Fig. 1 is a perspective view of my device ready for use,

Fig. 2 is a longitudinal sectional view of my item, with the supporting tricycle shown in dotted lines.

Figure 4:
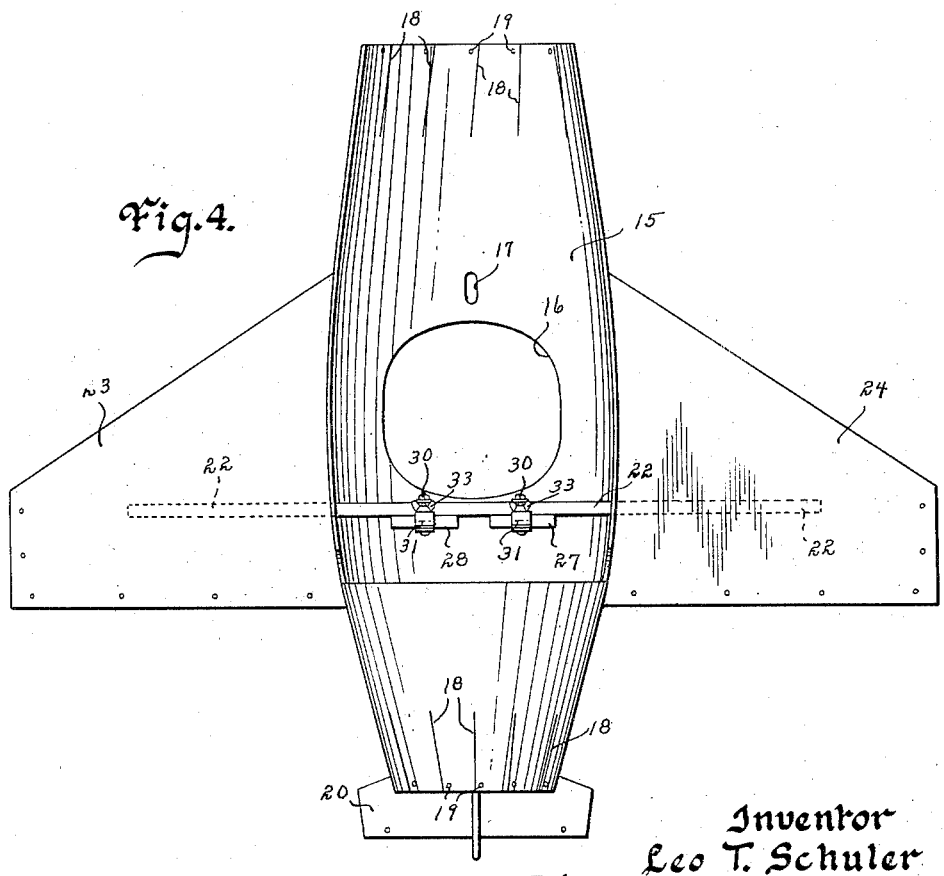

In these drawings I have used the numeral 10 to generally designate a tricycle having the fork bearing 11, handle bar 13, and the rear cross frame 14. While my device may be successfully used on other self propelled vehicles, I shall describe it as particularly adapted for quick installation on a common tricycle. The numeral 15 designates the body portion open at its central bottom to accommodate the wheels of the tricycle and feet of the user. This body housing 15 is open at both ends, has a fuselage cockpit opening 16, and a small hole 17 forward of the cockpit opening as shown in Fig. 4. This fuselage housing may be made of any suitable material. From an economical standpoint, I recommend cardboard. The entire housing may be cut from a single blank, and slit cuts 18 may be formed in each end and then the portions lapped and held together by rivets, staples, bolts, glue or like 19 as shown in Fig. 1.

This operation will taper both front and rear end portions to simulate in general the fuselage of a jet airplane. The numeral 20 designates the tail assembly which also may be of folded cardboard. A wooden brace 21 for strength may be employed. This brace may extend vertically from the inside rear bottom of the fuselage and into the tail assembly as shown in Fig. 2. A horizontal brace beam 22 extends transversely across the inside of the fuselage and just rear of the plane of the cockpit. In Fig. 1, this brace extends through the fuselage sides and into the wing portions 23 and 24 for supporting the same. The wings 23 and 24 are made similar to that of the tail assembly. Rivets, staples, glue or like may be also used in making the wings and tail assembly.

For strength, the edges of these members may be turned out to provide flange portions 25, and these flanges may be secured to the fuselage by rivets, staples, glue or like.

Once the airplane form has been formed, a very strong, rigid housing results, even though the major portion of the same is made from folded cardboard or like. If desired, the wings may be hinged to the fuselage in order that they may be elevated for storage, or passage through narrow passageways, such as doors, hallways or like. This folding of the wings is illustrated by dotted lines in Fig. 3. Any type of lock, catch or like 26 may be employed to hold the hinged wings.

Figure 3:
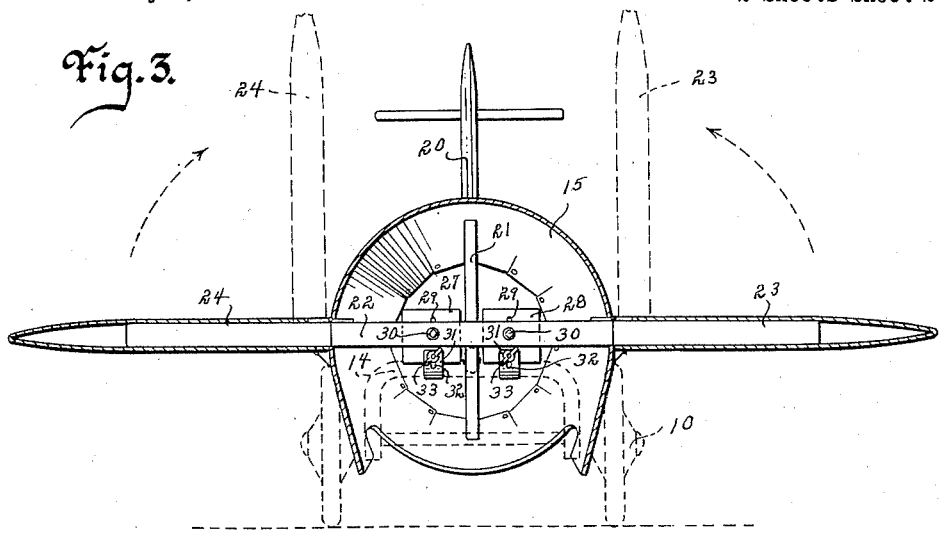
Fig. 3 is a transverse cross-sectional view taken on line 3—3 of Fig. 2 and illustrating how the wings may be elevated for storage, passing through a door or like, and Fig. 4 is a bottom plan view of my device before being installed on a tricycle.

On the center area of the horizontal brace are two vertically adjustable blocks 27 and 28. They are adjustable vertically by each having a vertical slot 29 through which extends a bolt means 30 and which also extends through the brace. The bottom of each block is concave, as shown in Fig. 2, to engage and rest on the tricycle cross brace bar. On each block is a hook member 31, having its hooked end extending around and under the tricycle cross brace, as shown in Fig. 3. Each hook member is vertically adjustably secured to its respective block by having a vertical slot 32, through which extends a bolt means 33. This bolt means also extends through the adjacent block.

The practical operation of my item is as follows. The detachable handle bar of the tricycle is first removed. My entire unit is placed down and on the tricycle with its cross bar 14 being engaged by the blocks. This obviously will support the rear portion of the unit on the tricycle. The hook members 31 are placed tightly under the tricycle cross bar and the bolt means 33 tightened. The front end of my unit will be supported by resting on the tricycle fork bearing 11. Merely by replacing the detachable handle bar 13, my unit will be installed as shown in Fig. 1. If the fuselage cants, it is easily straightened by lowering or raising one or the other of the blocks 27 and 28. If the unit is not longitudinally level, both blocks are either lowered or raised as the case may be.

Once installed, all youngsters enjoy using the tricycle, and which to them is an airplane. The unit may be as easily removed. All that is necessary is to remove the handle bar and detach the hook members 31, at which time my device may be lifted from the tricycle.

Inasmuch as I have described my device as fabricated of cardboard and a few wooden braces, it may be shipped and sold knocked down.

While I have formed my unit in the design of an airplane, obviously other simulated detachable bodies may be used such as animals, tractors, trucks, automobiles or like.

Some changes may be made in the construction and arrangement of my detachable aircraft simulating body for tricycles without departing from the real spirit and purpose of my invention, and it is my intention to cover by my claims, any modified forms of structure or use of mechanical equivalents which may be reasonably included within their scope.

I claim:
1. In combination with a tricycle having a detachable handle bar unit and a rear cross frame brace, a fuselage loosely embracing the main portion of said tricycle; said fuselage having a cockpit opening in its top and a hole forward thereof embracing said handle bar, a cross brace in said fuselage, a block portion on said cross brace having its under side beveled to receive and engage the cross frame brace of said tricycle, and a member on said block hooking under said cross frame brace.

2. In combination with a tricycle having a detachable handle bar unit and a rear cross frame brace, a fuslage loosely embracing the main portion of said tricycle; said fuselage having a cockpit opening in its top and a hole forward thereof embracing said handle bar, a cross brace in said fuselage, a movably adjustable block portion on said cross brace having its under side beveled to receive and engage the cross frame brace of said tricycle, and a member on said block hooking under said cross frame brace.

References Cited in the file of this patent

UNITED STATES PATENTS

| | | |
|---|---|---|
| 1,516,321 | Armitage | Nov. 18, 1924 |
| 1,550,513 | Davis | Aug. 18, 1925 |
| 1,562,244 | Morrill | Nov. 17, 1925 |
| 1,758,432 | Crow | May 13, 1930 |
| 2,225,560 | Hartman | Dec. 17, 1940 |
| 2,643,133 | Lucchesi | June 23, 1953 |

FOREIGN PATENTS

| | | |
|---|---|---|
| 822,337 | Germany | Nov. 26, 1951 |